(12) United States Patent
Herinckx et al.

(10) Patent No.: US 7,832,047 B2
(45) Date of Patent: *Nov. 16, 2010

(54) WIPER BLADE

(75) Inventors: Dirk Herinckx, Linter (BE); Inigo Op't Roodt, Hasselt (BE); Hans Beelen, Herk de Stad (BE); David Van Baelen, Herent (BE)

(73) Assignee: Robert Bosch GmbH, Stuttgart (DE)

( * ) Notice: Subject to any disclaimer, the term of this patent is extended or adjusted under 35 U.S.C. 154(b) by 812 days.

This patent is subject to a terminal disclaimer.

(21) Appl. No.: 10/594,304

(22) PCT Filed: Feb. 8, 2005

(86) PCT No.: PCT/EP2005/050545

§ 371 (c)(1),
(2), (4) Date: Jun. 26, 2007

(87) PCT Pub. No.: WO2005/092680

PCT Pub. Date: Oct. 6, 2005

(65) Prior Publication Data

US 2007/0289082 A1 Dec. 20, 2007

(30) Foreign Application Priority Data

Mar. 26, 2004 (DE) .................. 10 2004 015 423

(51) Int. Cl.
*B60S 1/36* (2006.01)
(52) U.S. Cl. .................. 15/250.43; 15/250.453; 15/250.201
(58) Field of Classification Search ............ 15/250.452, 15/250.453, 250.201, 250.454, 250.43, 250.44, 15/250.361
See application file for complete search history.

(56) References Cited

U.S. PATENT DOCUMENTS

| 2,741,792 | A | * | 4/1956 | Ehrlich et al. | 15/250.452 |
| 2,782,443 | A | * | 2/1957 | Krohm | 15/250.452 |
| 3,116,507 | A | * | 1/1964 | Scinta | 15/250.451 |
| 3,626,544 | A | * | 12/1971 | Lopez et al. | 15/250.361 |
| 4,360,943 | A | * | 11/1982 | Thompson et al. | 15/250.454 |
| 6,581,238 | B1 | | 6/2003 | Sevellec | |
| 6,668,419 | B1 | | 12/2003 | Kotlarski | |
| 6,944,905 | B2 | * | 9/2005 | De Block et al. | 15/250.201 |
| 6,978,512 | B2 | | 12/2005 | Dietrich et al. | |

(Continued)

FOREIGN PATENT DOCUMENTS

DE 3842586 * 7/1989

(Continued)

*Primary Examiner*—Gary K Graham
(74) *Attorney, Agent, or Firm*—Michael Best & Friedrich LLP

(57) ABSTRACT

The invention relates to a wiper blade (10) comprising a supporting element (12), on whose one side a wiper strip (14) can be mounted and on whose other side a connecting device (16) for a wiper arm (18) can be mounted, and which has two longitudinal rails (38) that are fixed relative to one another via bridges (40) and covered by caps (30, 70) at their ends (42). It is proposed that at least one cap (30, 70) consist of several parts and have a basic body (32, 72) and at least one moveable part (34, 74), wherein the basic body (32, 72) establishes a connection to the longitudinal rails (38), and the moveable part (34, 74) directly and/or indirectly fixes the wiper strip (14).

17 Claims, 7 Drawing Sheets

U.S. PATENT DOCUMENTS 7,210,190 B2 * 5/2007 Schmid et ............... 15/250.43
7,581,280 B2 * 9/2009 Op't Roodt et al. ...... 15/250.43

FOREIGN PATENT DOCUMENTS

| DE | 100 00 373 | | 8/2001 |
|----|------------|---|--------|
| DE | 100 25 710 | | 8/2001 |
| WO | WO 01/30618 | | 5/2001 |
| WO | 02/04265 | * | 1/2002 |
| WO | WO 2004/056623 | | 7/2004 |

* cited by examiner

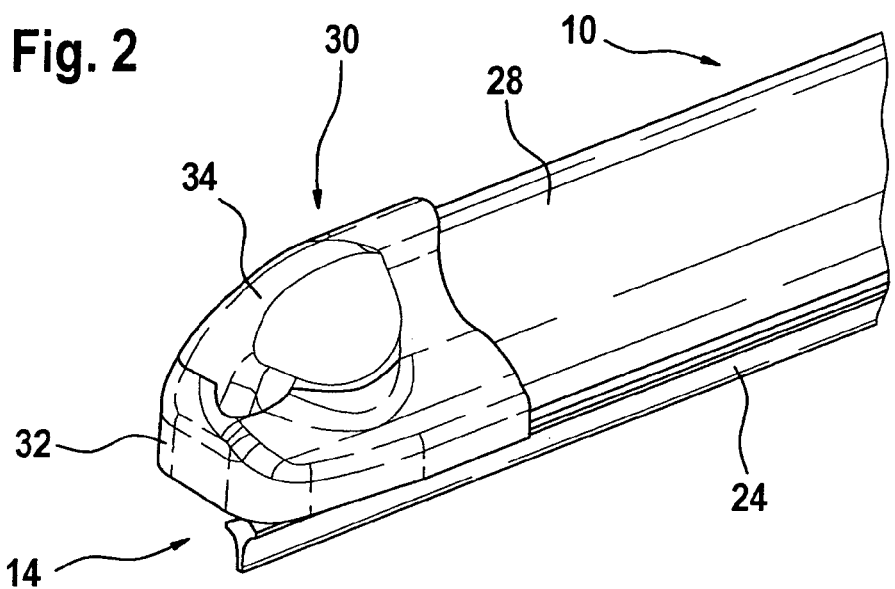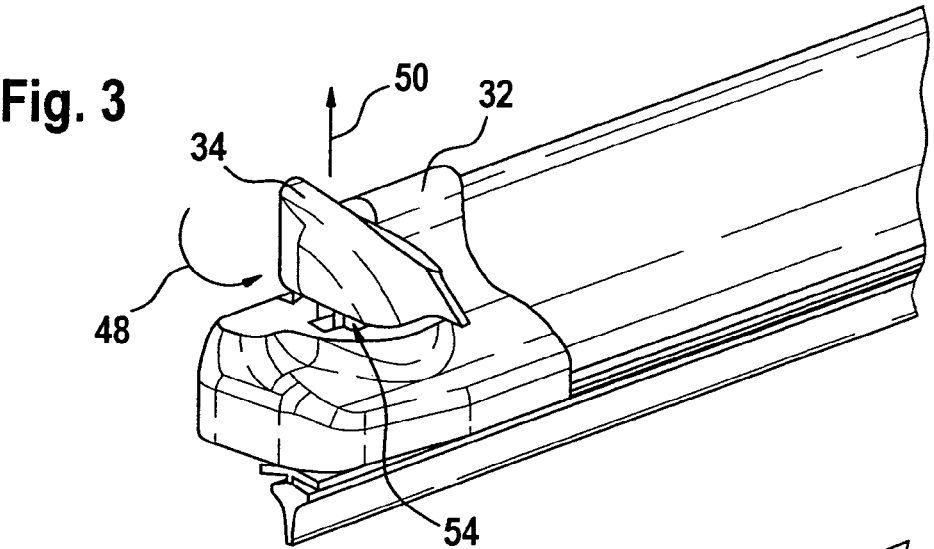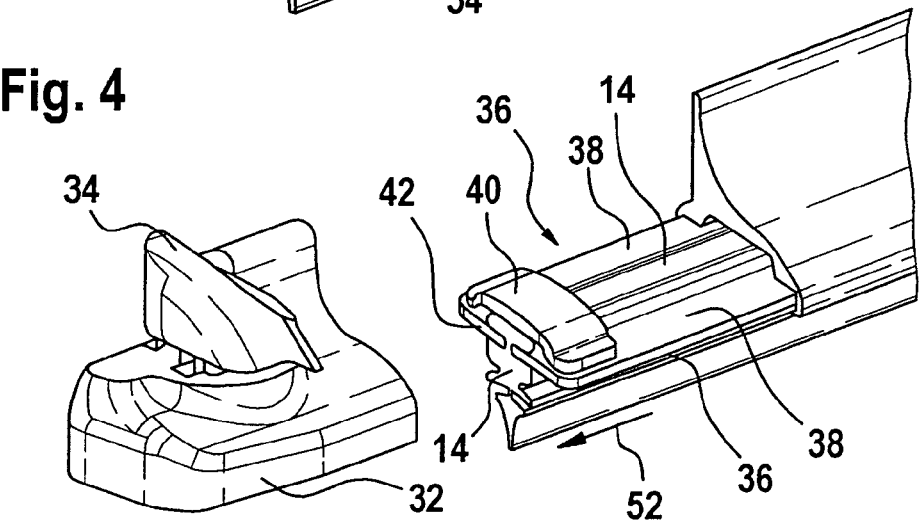

WIPER BLADE

BACKGROUND OF THE INVENTION

In the case of wiper blades in accordance with the species, the supporting element is supposed to guarantee the most uniform possible distribution of the wiper blade application force originating from the wiper arm connected to a wiper blade on the windshield over the entire wiper field being covered by the wiper blade. Because of a corresponding curvature of the unstressed supporting element—i.e., when the wiper blade is not adjacent to the windshield—the ends of the wiper strip that is applied completely to the window during wiper blade operation are stressed by the then tensioned supporting element on the windshield, even though the curvature radii of spherically curved vehicle windshields change with every wiper blade position. The curvature of the wiper blade must therefore be somewhat greater than the greatest curvature measured in the wiper field on the to-be-wiped windshield. The supporting element thereby replaces the expensive supporting bracket design with two spring rails arranged loosely in the wiper strip as is the practice with conventional wiper blades.

SUMMARY OF THE INVENTION

The invention starts with a wiper blade such as is known from German Laid Open Print DE-OS 100 25 710. With respect to the wiper blades described there, the supporting element features two parallel longitudinal rails, which are permanently connected to one another via bridges. The longitudinal rails engage with longitudinal sides that face one another in grooves of a wiper strip and thereby fix said rails perpendicular to the axial longitudinal extension. A bridge has a tongue-like extension, on whose end a hook is formed, which presses into an upper side of the wiper strip in an assembled position, thereby fixing it in the axial longitudinal direction. As a result, this guarantees that the wiper strip and the supporting element can move relative to one another in the axial direction, but, despite this, the wiper strip is secured axially at least at one point. The relative movability in the axial direction is required, if the wiper blade is to follow different curvature progressions of the windshield during wiper operation. The disadvantage of these systems is that when the wiper strip wears out, the complete wiper blade must be replaced as a ready-made mounted unit. Separate tools are required if only the wiper strip is supposed to be replaced. Furthermore, with frequent replacement of the wiper strip there is the risk of fatigue or even fracture of the tongue-like extension.

The advantage of the wiper blade in accordance with the invention is that it is possible to replace the wiper strip without tools and therefore this can be carried out without difficulty by the end user at any location. In addition, the risk of a fatigue fracture is averted. This is made possible in accordance with the invention in that the axial securing device is no longer formed on the supporting element and a separate part is used for this. Nevertheless, an additional part is not required, because the terminal or protective caps that are customary in these wiper blades can be used for this purpose. In this case, the cap consists of several parts and has at least a basic body and at least one moveable part, wherein the basic body establishes a connection to the longitudinal rails and the moveable part directly and/or indirectly fixes the wiper strip. Nevertheless, should a fatigue fracture also occur in this case (something that is actually precluded), the terminal cap can be replaced without difficulty since it is a separate part.

Advantageous developments of the wiper blade in accordance with the invention are possible. Fixation is achieved in an especially simple manner if a mandrel or a compression body is used for this purpose. A sharp mandrel can press into the soft wiper strip largely without force, while the advantage of a compression body is that it does not damage the wiper strip body, whereby tearing of said wiper strip body is avoided.

If the mandrel or the compression body is arranged on the moveable part, axial fixation occurs directly via the movement executed by the end user. This movement can be felt directly so that control of the connection is possible in this case. On the other hand, if the mandrel or the compression body is arranged on the basic body, fixation occurs indirectly via the moveable part. This allows the required expenditure of force to be reduced. It is also possible to combine both variations with each other, which further increases the security of the connection.

A connection that is easy to assemble and simple to produce is yielded if the moveable part is connected to the basic body via an insertion-rotation connection. This type of connection that is also called a bayonet joint is generally known and does not require any extensive explanations for the end user. On the other hand, a moveable part that is coupled with the basic body includes the advantage of captivity. This advantage should not be disregarded, especially when assembly takes place under poor weather conditions.

If the moveable part or the basic body has ramps, which can grip behind and/or under the bridges, the protective cap can be secured relative to the supporting element as a result. If the ramps are provided with starting bevels, this securing can be established in a guided manner without great expenditure of force.

BRIEF DESCRIPTION OF THE DRAWINGS

Exemplary embodiments of the wiper blade in accordance with the invention are depicted in the drawings and explained in greater detail in the following description.

FIGS. 2 through 4 show the three steps for removing the cap from the one end of a wiper blade with a cap in accordance with a first exemplary embodiment.

DETAILED DESCRIPTION

Figure 1:
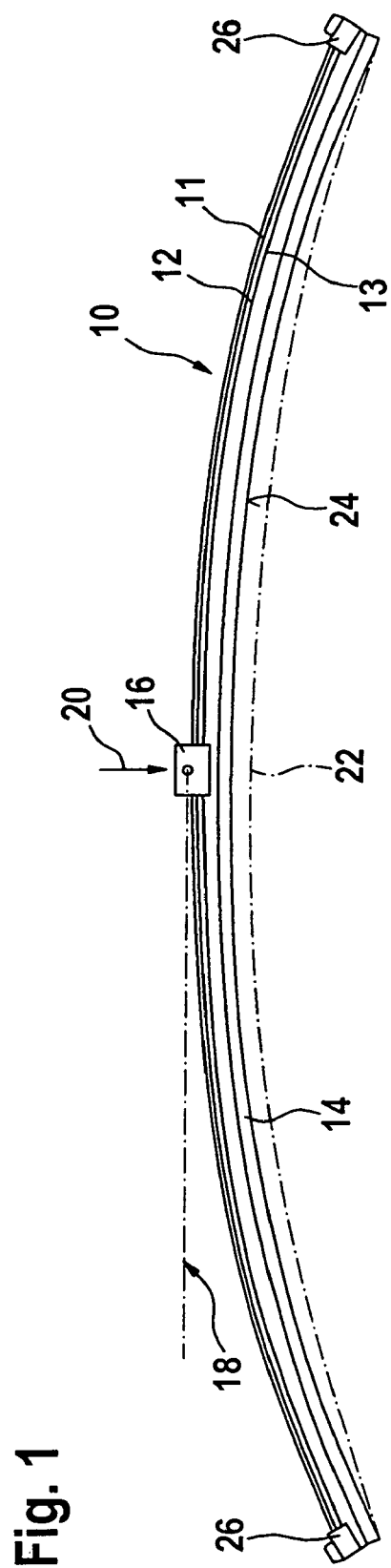
FIG. 1 shows in general a side view of a wiper blade of the type in accordance with the species.

A wiper blade 10 depicted in FIG. 1 has a band-like, elongated, spring elastic supporting element 12, on whose underside 13 a elongated rubber elastic wiper strip 14 is arranged in a longitudinally axially parallel manner. Directly arranged on the upper side 11 of the supporting element 12 that can also be designated as a spring girder is the part of the connecting device 16 on the wiper blade side, with whose assistance the wiper blade 10 can be detachably connected in an articulated manner to a driven wiper arm 18 indicated in FIG. 1 by a dot-dash line. For this purpose, the wiper arm 18 is provided on its free end with the part of the connecting device on the wiper arm side. The wiper arm 18 is stressed in the direction of arrow 20 towards the to-be-wiped window, e.g., towards the windshield of a motor vehicle, whose to-be-wiped surface is indicated by a dot-dash line 22 in FIG. 1. Since the line 22 is supposed to represent the greatest curvature of the window surface, it is clearly evident that the curvature of the as yet unstressed wiper blade 10 with its two ends adjacent to the window is greater than the maximum curvature of the window. Under the application force (arrow 20), the wiper blade 10 with its wiper lip 24 is applied over its entire length to the window surface 22. In the process, tension builds up in the spring elastic supporting element 12 that is manufactured of metal for example, which provides for a proper application of the wiper strip 14 or the wiper lip 24 over its entire length on the window, as well as for a uniform distribution of the application pressure. A cap 26 grips over the supporting element 12 on each end as viewed in the longitudinal direction; the caps can rest relatively flatly on the supporting element 12 since the wiper blade 10 depicted in FIG. 1 does not have a wind deflector strip.

The caps will be depicted in the following figures in accordance with different exemplary embodiments and variations, and explained in the description, whereby the same reference numbers will be used for like components.

The wiper blade 10 depicted in FIG. 2 has a wind deflector strip 28 gripping over the supporting element 12 and, as far as the wind deflector strip is concerned, a cap 30 in accordance with the first exemplary embodiment grips over it and covers it. In the area where it overlaps, the cap 30 has the curved shaped of the wind deflector strip 28. The cap 30 is embodied to consist of several parts (two parts in this case) and includes a basic body 32 and a moveable part 34, which forms a transition from the curved shape phasing out towards the end of the wiper blade 10. The basic body grips 32 over the supporting element 12, which includes two longitudinal rails 38 that are fixed relative to each other via bridges 40 (FIG. 4) on its outer flanks 36, as well as at the longitudinal end 42, thereby producing a connection to the longitudinal rails 38 or the supporting element 12. On the one hand, the movable part 34 is rotatably mounted in the basic body 32 and, on the other hand, is able to secure the position of the wiper strip 14 against axial displacement.

Figure 5:
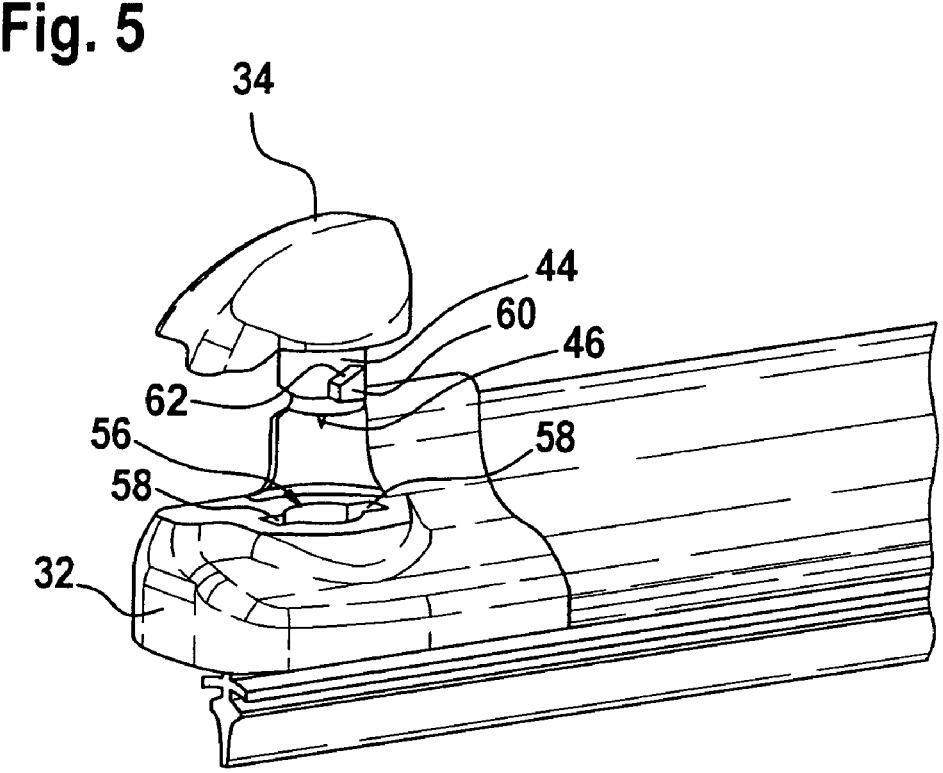
FIG. 5 shows a view according to FIG. 2 shortly before assembly of the moveable part.
Figure 6:
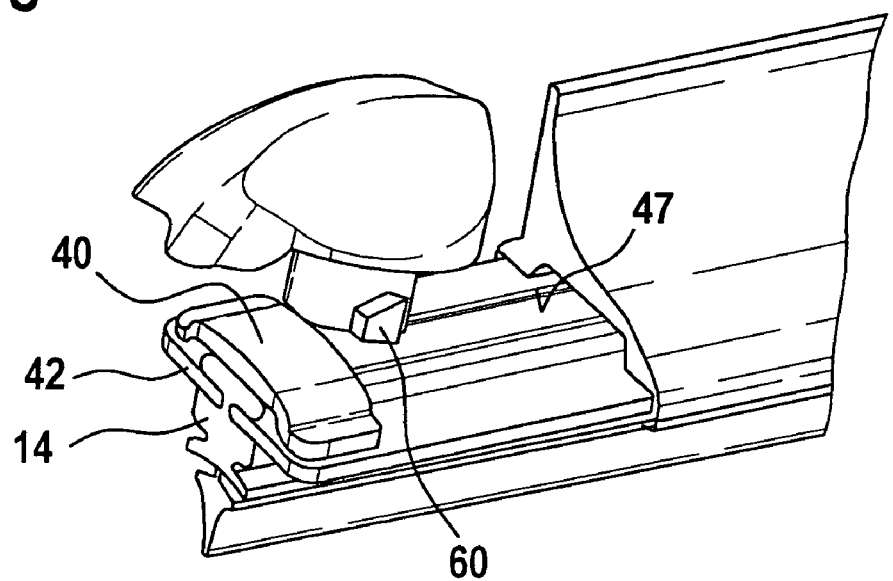
FIG. 6 shows a view according to FIG. 2 without the basic body.
Figure 7:
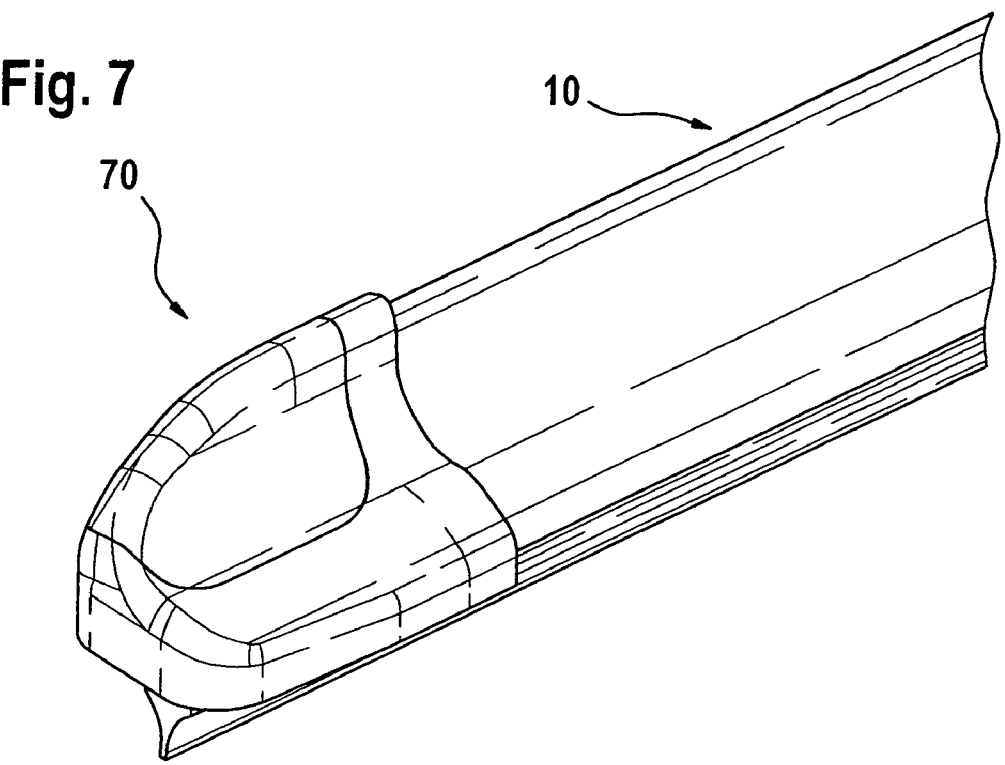
FIGS. 7 through 9 show views that are analogous to FIGS. 2 through 4 in accordance with a second exemplary embodiment.
Figure 8:
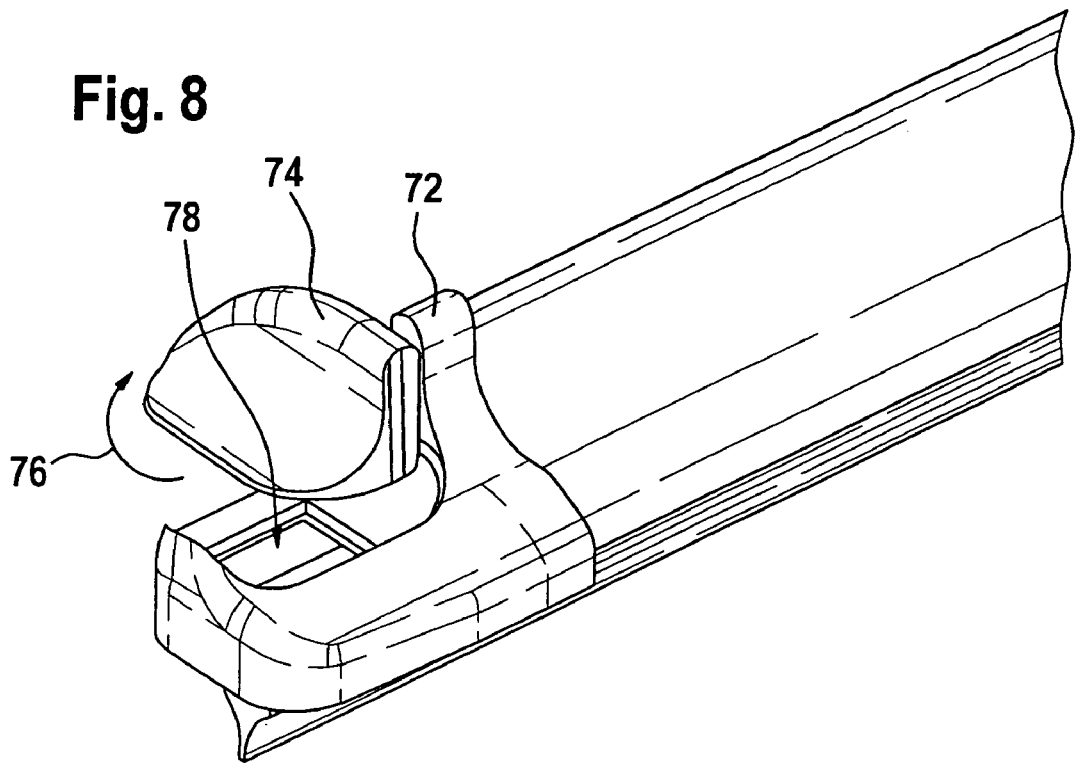

As FIG. 5 shows, the movable part 34 has a mandrel 46 on a shaft 44 pointing in the installation direction of the wiper strip 14 and in the final installation position, as depicted in FIG. 6 without the basic body 32, this mandrel presses into the upper side 47 of the wiper strip 14. The shaft 44 then abuts the bridge 40 and prevents the cap 30 from being able to shift in the direction of the longitudinal end 42. Since the basic body 32 abuts the other side of the bridge 40, the terminal cap 30 is fixed in terms of its axial position. Because of the mandrel 46 that extends into the wiper strip 14, the wiper strip 14 is thereby also secured at this point in terms of its axial position. Of course, the mandrel 46 can also assume other shapes and be embodied, e.g., as one or more sharp edges, as a sharp honeycomb structure or the like.

FIGS. 2 through 4 show the sequence of steps that are required to remove the cap 30 from the wiper blade 10. Accordingly, the moveable part 34 is rotated from its operating position depicted in FIG. 2 along arrow 48 and lifted upwards in the direction of arrow 50 at least a bit. In this position, both the shaft 44 and the mandrel 46 are no longer engaged or are far enough away from the upper side 47 of the wiper strip 14 that the cap 30 can be pulled off in the direction of arrow 52 and both the shaft 44 and the mandrel 46 are guided over the bridge 40.

In the position depicted in FIG. 4, the wiper strip 14 can then be pulled out of the supporting element 12 along the longitudinal rails 38 and a new wiper strip 14 can be threaded in again.

The cap 30 is assembled in the reverse sequence. The cap 30 is slid on against arrow 52, the moveable part 34 is inserted against arrow 50 and rotated against arrow 48.

It is already clear from the forgoing sequence of movement that the movable part 34 is connected via an insertion-rotation connection 54. For this purpose, the basic body 32 has a circular opening 56, which is provided with radial recesses 58. Two radial recesses 58 are provided in the case at hand, whereby this number can vary, however. The shaft 44 of the moveable part 34 has an outside diameter that corresponds to the diameter of the circular opening 56. In addition, ramps 60 (only one of which can be seen in FIGS. 5 and 6) are attached to the shaft 44, and these ramps can be inserted into the radial recesses 58. In FIG. 5, the moveable part 34 is depicted in a position above the basic body 32 in which it would be positioned in its closed position. As is evident, the moveable part must be rotated 90 degrees counterclockwise in order to insert the moveable part 34 into the circular opening 56. When turning against arrow 48, the ramps 60 in this exemplary embodiment grip under the basic body 32 and end up outside of the bridges 40 in their final position, as shown in FIG. 6 without the basic body. The shaft 44 and the ramps 60 thereby grip behind the bridges 40.

Alternatively, the ramps 60 can be arranged on the shaft 44 rotated by 90 degrees, which would also necessitate a corresponding correction of the radial recesses 58, so that in a closed position the ramps 60 grip under the bridges 40.

Starting bevels 62 are formed on the ramps 60 and, with a rotation against arrow 48, these starting bevels automatically guide the movable part 34 in the direction against arrow 50. As a result, the expenditure of force that is required to press the moveable part 34 with its mandrel 46 into the wiper strip 14 is substantially reduced.

Analogous to FIGS. 2 through 4, FIGS. 7 through 9 show how a cap 70 in accordance with a second exemplary embodiment can be removed from the end of the wiper blade 10. The cap 70 has a basic body 72, as well as a moveable part 74, which, in order to open, is rotated relative to the basic body 72 in the direction of arrow 76, thereby freeing an opening 78 in the basic body 72. The cap 70 can then be pulled off the end of the wiper blade 10 against arrow 80. During the process of pulling off the cap, a flexible tongue 82 first moves upward into the opening 78 in the direction of double arrow 84, and then springs downwards again.

Figure 9:
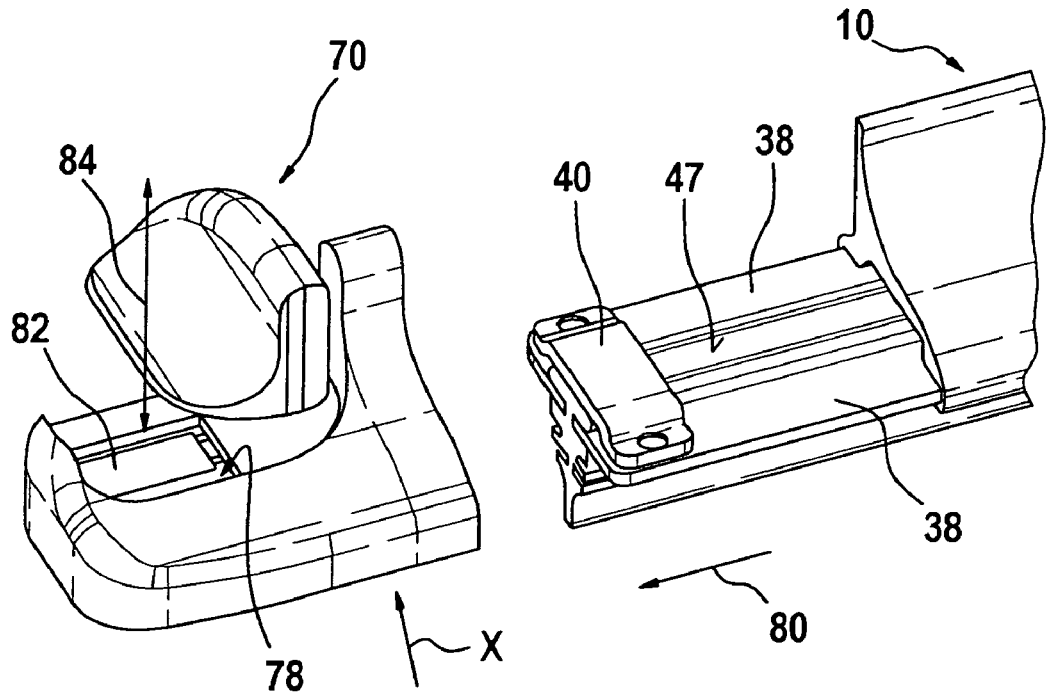
Figure 10:
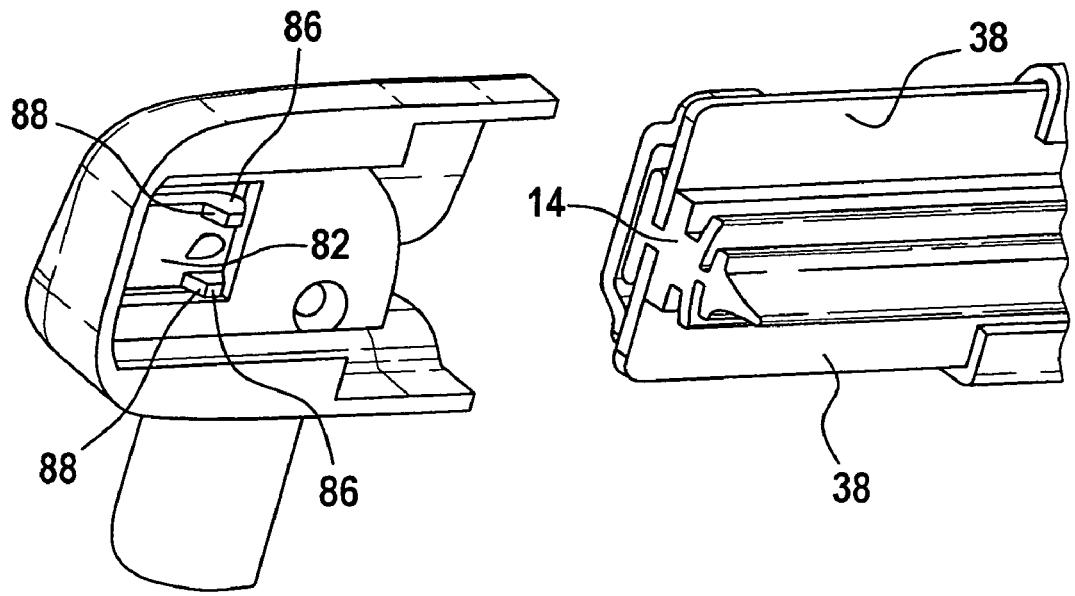
FIG. 10 shows a view in the direction of arrow X in FIG. 9.

It is evident in FIG. 10, which shows a view in the direction of arrow X in FIG. 9, that two ramps 86 are formed on the flexible tongue 82, which ramps are pulled over the bridge 40 when the cap is pulled off, thereby triggering the lifting movement in the direction of double arrow 84.

In order to facilitate this lifting movement without difficulty, the ramps 86 have starting bevels 88, which are attached on both sides and thus engage both when pulling off as well as when attaching the cap 70. The starting bevels 88 are shown to be flat in this case, but they can also be curved for example in the form of a concave profile.

Figure 14:
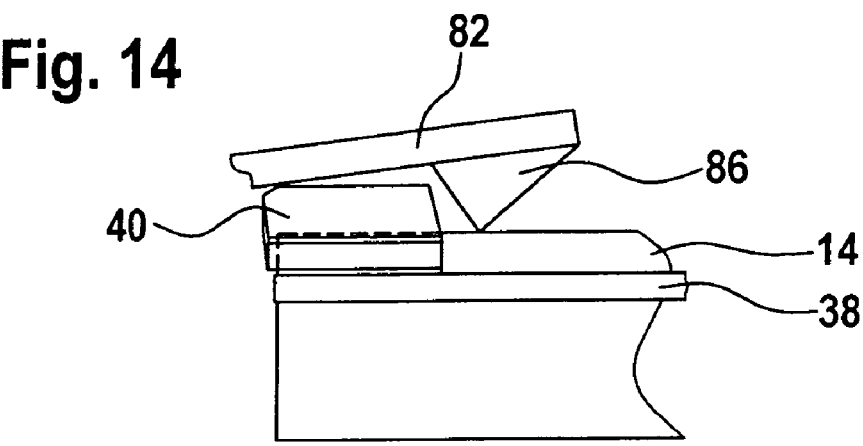
FIGS. 14 through 16 show schematic diagrams, which depict the gripping behind and/or gripping under of the ramps in different variations as well as a compression body.
Figure 15:
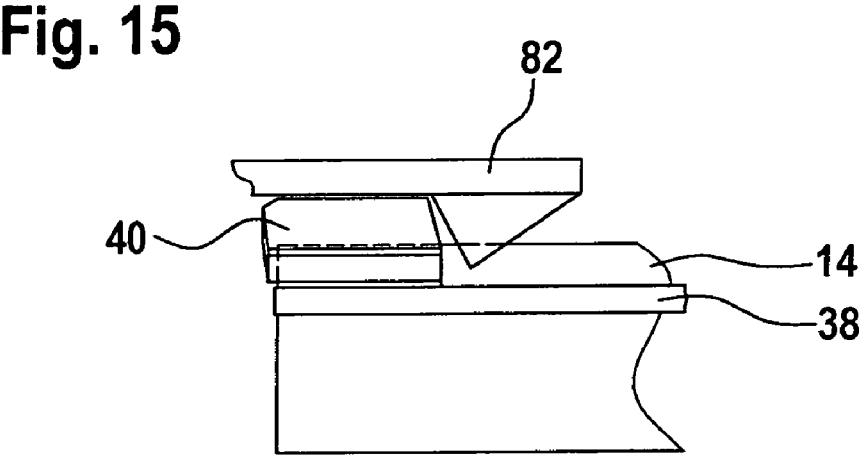
Figure 16:
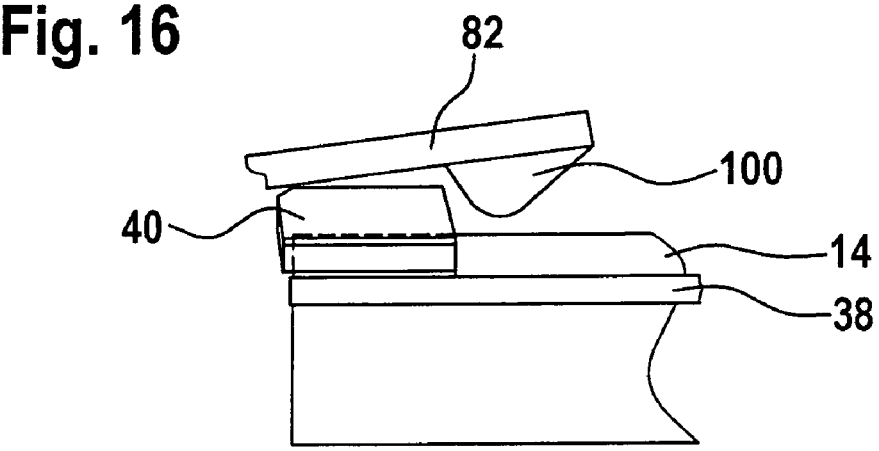

In addition, a mandrel 90 is formed on the tongue 82, and in an assembled state this mandrel engages in the upper side 47 of the wiper strip 14. As a result of this mandrel 90, the wiper strip 14 is fixed in the axial direction at this point against displacement. When the cap 70 is pulled off, the mandrel 90 is pulled out of the wiper strip 14 by the lifting movement of the flexible tongue 82 caused by the ramps 86 so that the cap 70 can be moved without the wiper strip 14 being damaged. In a variation depicted in FIGS. 14 and 15, a ramp 86 is embodied as a mandrel 90 and therefore, in addition to securing the cap 70, also assumes fixation of the wiper strip 14. In FIG. 16, the mandrel is depicted as a compression body 100, which merely squeezes the wiper strip 14 in such a way that it is tensioned between the longitudinal rails 38 and/or the bridge 40 and is thereby fixed against axial displacement. This variation can also be realized in the first exemplary embodiment.

Figure 11:
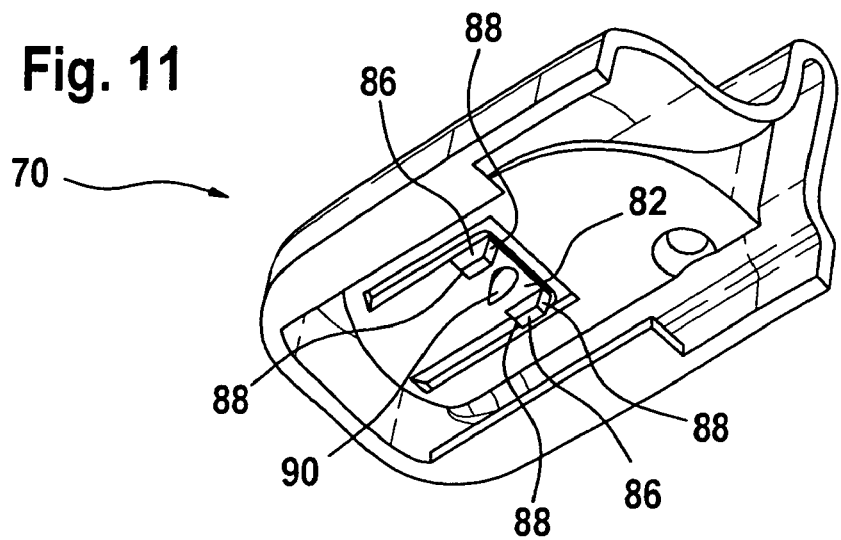
FIGS. 11 and 12 show diagonal views from below into a cap in accordance with the second exemplary embodiment without a bridge and with a bridge, respectively.
Figure 12:
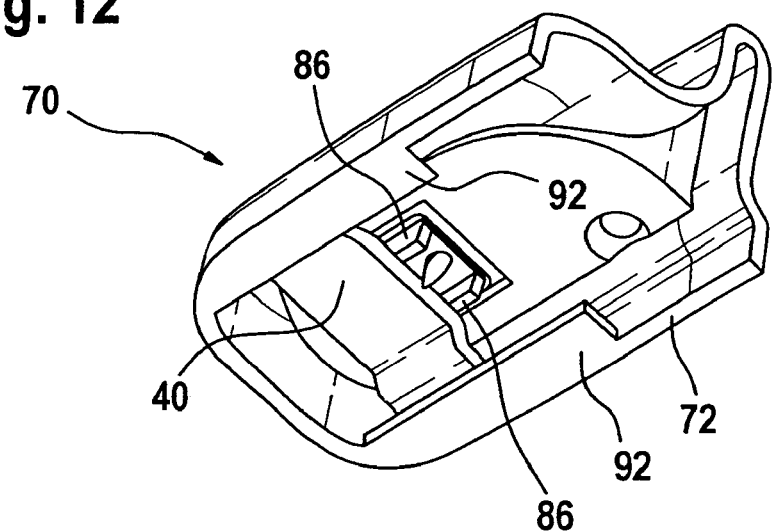
Figure 13:
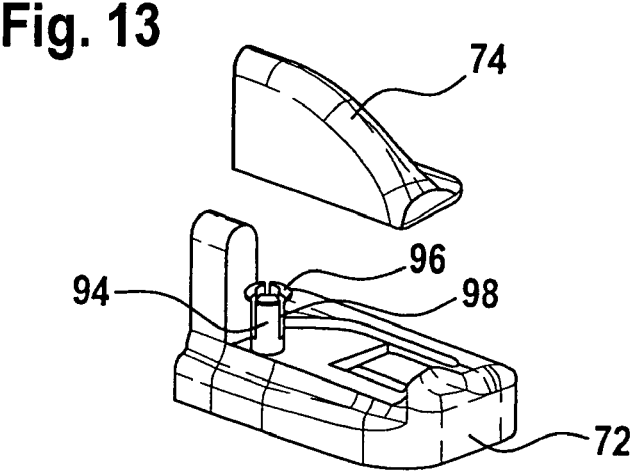
FIG. 13 depicts a cap in accordance with the second exemplary embodiment with a removed, moveable part.

FIGS. 11 and 12 depict the cap 70, whereby a bridge 40 is also shown in FIG. 12. It shows how the ramps 86 abut the edge of the bridge 40 so that axial securing is guaranteed. Furthermore, it shows that guide rails 92 are formed on the basic body 72, which encircle the edge area of the bridge 40 and as a result the longitudinal rails 38 in an assembled state. In this way, a connection is established between the basic body 72 and the longitudinal rails 38. The connection of the basic body 32 of the cap 30 in the first exemplary embodiment is also established to the longitudinal rails 38 in the same way.

Projecting from the basic body 72 is an axis 94 at which the moveable part 74 is rotatably mounted. The axis 94 is formed directly on the basic body 72 that is embodied as an injection molded part. It has a collar 96 as well as a slot 98, which make it possible to clip on the moveable part 74.

Instead of an insertion-rotation connection or an articulated connection, it is also conceivable for the movable part 34 in the first exemplary embodiment or the moveable part 74 in the second exemplary embodiment to be fastened in another manner, e.g., via a film hinge joint or a snap-in connection. In this context, the concept "consisting of several parts" is to be interpreted with respect to the functionality of the cap.

The invention claimed is:

1. Wiper blade (10) comprising a supporting element (12), on whose one side a wiper strip (14) can be mounted and on whose other side a connecting device (16) for a wiper arm (18) can be mounted, and which has two longitudinal rails (38) that are fixed relative to one another via bridges (40) and covered by caps (26, 30, 70) at their ends (42), characterized in that at least one cap (26, 30, 70) consists of several parts and has a basic body (32, 72) and at least one moveable part (34, 74), wherein the basic body (32, 72) establishes a connection to the longitudinal rails (38) and the moveable part (34, 74) directly and/or indirectly fixes the wiper strip (14), and characterized in that the moveable part (34) is connected to the basic body (32) via an insertion-rotation connection (54).

2. Wiper blade according to claim 1, characterized in that the wiper strip (14) is fixed relative to the supporting element (12) by means of at least one mandrel (46, 90) or at least one compression body (100).

3. Wiper blade according to claim 2, characterized in that the at least one mandrel (46, 90) or the at least one compression body (100) is arranged on the moveable part (34, 74).

4. Wiper blade according to claim 3, characterized in that the at least one mandrel (46, 90) or the at least one compression body (100) is arranged on the basic body.

5. Wiper blade according to claim 4, characterized in that the moveable part (34, 74) has ramps (60, 86), which can grip behind and/or under the bridges (40).

6. Wiper blade according to claim 5, characterized in that the ramps (60, 86) have starting bevels (62, 88).

7. Wiper blade according to claim 4, characterized in that the basic body (32, 72) has ramps (60, 86), which can grip behind and/or under the bridges (40).

8. Wiper blade according to claim 7, characterized in that the ramps (60, 86) have starting bevels (62, 88).

9. Wiper blade according to claim 2, characterized in that the at least one mandrel (46, 90) or the at least one compression body (100) is arranged on the basic body.

10. Wiper blade according to claim 1, characterized in that the moveable part (34, 74) has ramps (60, 86), which can grip behind and/or under the bridges (40).

11. Wiper blade according to claim 10, characterized in that the ramps (60, 86) have starting bevels (62, 88).

12. Wiper blade according to claim 1, characterized in that the basic body (32, 72) has ramps (60, 86), which can grip behind and/or under the bridges (40).

13. Wiper blade according to claim 12, characterized in that the ramps (60, 86) have starting bevels (62, 88).

14. Wiper blade comprising a supporting element (12), on whose one side a wiper strip (14) can be mounted and on whose other side a connecting device (16) for a wiper arm (18) can be mounted, and which has two longitudinal rails (38) that are fixed relative to one another via bridges (40) and covered by caps (26, 30, 70) at their ends (42), characterized in that at least one cap (26, 30, 70) consists of several parts and has a basic body (32, 72) and at least one moveable part (34, 74), wherein the basic body (32, 72) establishes a connection to the longitudinal rails (38) and the moveable part (34, 74) directly and/or indirectly fixes the wiper strip (14), characterized in that the wiper strip (14) is fixed relative to the supporting element (12) by means of at least one mandrel (46, 90) or at least one compression body (100), characterized in that the at least one mandrel (46, 90) or the at least one compression body (100) is arranged on the basic body, characterized in that the moveable part (74) is coupled to the basic body (72), and characterized in that the moveable part (34, 74) has ramps (60, 86), which can grip behind and/or under the bridges (40).

15. Wiper blade according to claim 14, characterized in that the ramps (60, 86) have starting bevels (62, 88).

16. Wiper blade comprising a supporting element (12), on whose one side a wiper strip (14) can be mounted and on whose other side a connecting device (16) for a wiper arm (18) can be mounted, and which has two longitudinal rails (38) that are fixed relative to one another via bridges (40) and covered by caps (26, 30, 70) at their ends (42), characterized in that at least one cap (26, 30, 70) consists of several parts and has a basic body (32, 72) and at least one moveable part (34, 74), wherein the basic body (32, 72) establishes a connection to the longitudinal rails (38) and the moveable part (34, 74) directly and/or indirectly fixes the wiper strip (14), characterized in that the wiper strip (14) is fixed relative to the supporting element (12) by means of at least one mandrel (46, 90) or at least one compression body (100), characterized in that the at least one mandrel (46, 90) or the at least one compression body (100) is arranged on the basic body, characterized in that the moveable part (74) is coupled to the basic body (72), and characterized in that the basic body (32, 72) has ramps (60, 86), which can grip behind and/or under the bridges (40).

17. Wiper blade according to claim 16, characterized in that the ramps (60, 86) have starting bevels (62, 88).

* * * * *